United States Patent [19]

Malvern

[11] Patent Number: 5,038,618

[45] Date of Patent: Aug. 13, 1991

[54] MEASUREMENT OF DISTORTION

[75] Inventor: Alan R. Malvern, Bracknell, United Kingdom

[73] Assignee: British Aerospace Public Limited Company, London, England

[21] Appl. No.: 118,778

[22] Filed: Nov. 10, 1987

[30] Foreign Application Priority Data

Nov. 11, 1986 [GB] United Kingdom ................ 8626935
Oct. 12, 1987 [GB] United Kingdom ................ 8723955

[51] Int. Cl.$^5$ .............................................. G01L 1/24
[52] U.S. Cl. ...................................................... 73/800
[58] Field of Search ................................... 73/800, 763

[56] References Cited

U.S. PATENT DOCUMENTS

| 4,269,506 | 5/1981 | Johnson et al. | 73/800 |
| 4,654,520 | 3/1987 | Griffiths | 73/800 |
| 4,722,603 | 2/1988 | Graebner et al. | 73/800 |

FOREIGN PATENT DOCUMENTS

| 0178814 | 4/1986 | European Pat. Off. . |
| 2126820 | 3/1984 | United Kingdom . |
| 2136113 | 9/1984 | United Kingdom . |
| 2145515 | 3/1985 | United Kingdom . |
| 2145516 | 3/1985 | United Kingdom . |
| 2145517 | 3/1985 | United Kingdom . |
| 2165118 | 4/1986 | United Kingdom . |
| 2166020 | 4/1986 | United Kingdom . |
| 2172101 | 9/1986 | United Kingdom . |
| 8300744 | 3/1983 | World Int. Prop. O. . |

Primary Examiner—Ian J. Lobo
Attorney, Agent, or Firm—Nixon & Vanderhye

[57] ABSTRACT

The invention relates to detecting distortion in large engineering structures using one or more fibre optic cables bonded to or in the structure. An optical signal is transmitted along the cable and information is obtained from the received signal regarding the length and/or change in length of the cable.

2 Claims, 3 Drawing Sheets

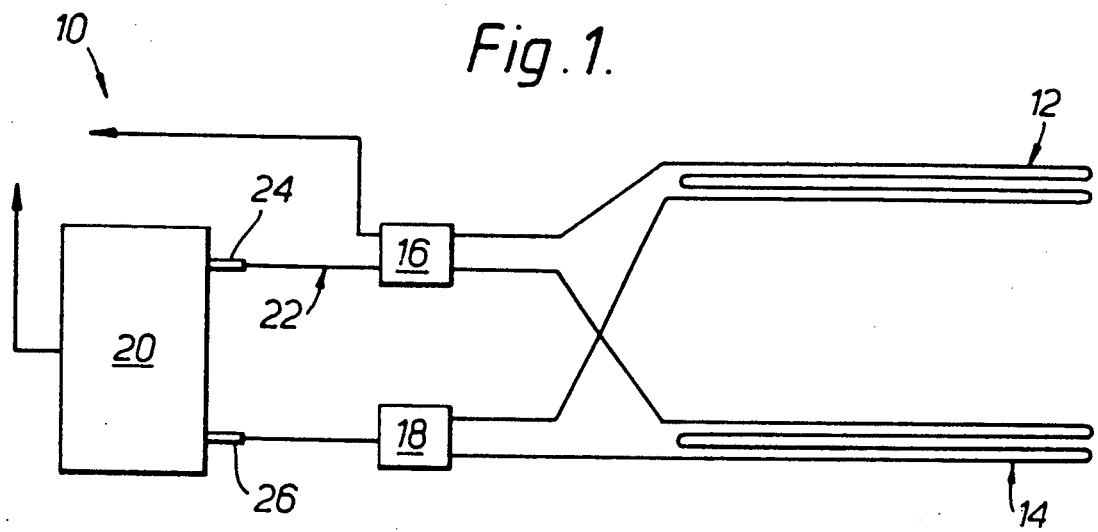
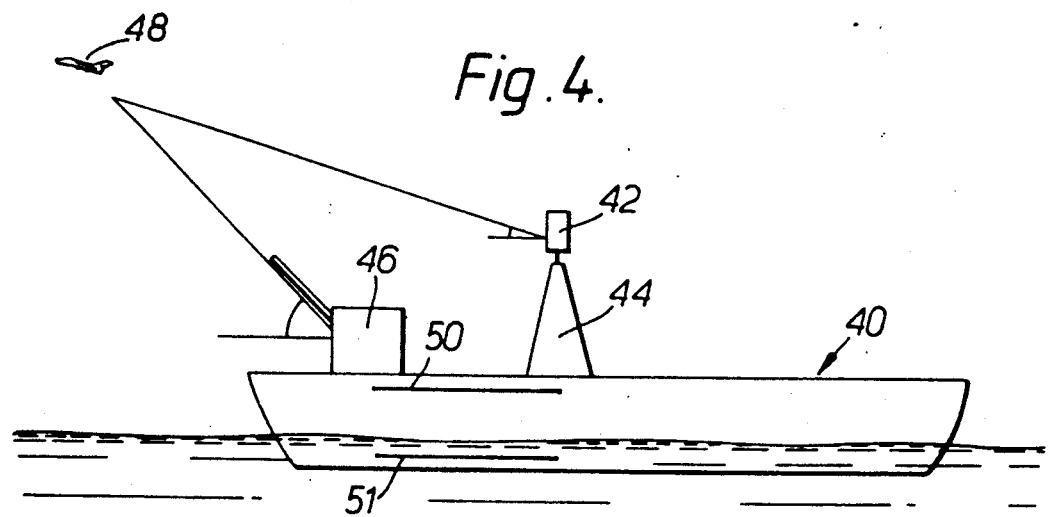
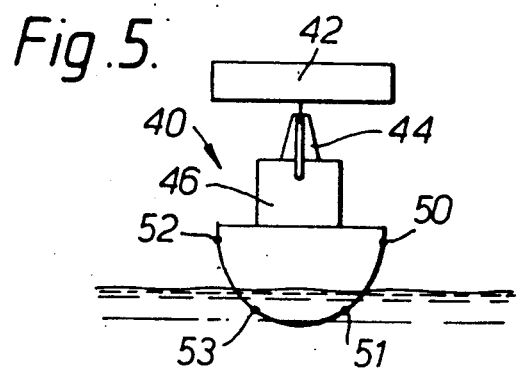

MEASUREMENT OF DISTORTION

The present invention relates to the measurement of distances between spaced points and relates particularly to the detection of deformations in large engineering structures, such as bridges, and in ships hulls, submarine hulls and railway lines. Other applications are also envisaged.

There is frequently a need to measure the relative positions of two spaced points to a high degree of accuracy. In a large engineering structure such as a bridge, under loading, the structure will deform so that there is a length change between two chosen points on the bridge and knowledge of this length change will give an indication of the loading of the bridge and whether the bridge is operating within its design limits. Such measurement may be carried out along the length of the supporting cables of a suspension bridge or along the length of the box sections that support vehicles crossing the bridge.

The relative positions of components of a large engineering structure can be measured by the use of theodolites and triangulation. However, such measurements do not provide continuous monitoring and may be difficult to achieve in certain environments. In addition, the two points of interest may not be along a line of sight e.g. if the structure is curved.

Another example of a possible application of the invention is in measuring the relative motion between components of an underwater structure such as an oil production platform. Such relative movement may be significant, indicating a weak or faulty weld and giving early warning of a potential failure. Presently, expensive diving operations are needed to carry out appropriate testing.

In order to obtain an early indication of any cracking or degradation of railway tracks or lines, for example due to settling, lack of alignment or poor welding, it is necessary to monitor the state of heavily used railway track such as commuter and main-line tracks. At present, the state of railway tracks is monitored periodically by passing a special purpose maintenance train over the track to check its state. However the use of such a train is expensive and because of its periodic use, an indication of a possible failure of the track may be missed between maintenance checks.

The present invention is also applicable to the measurement of the flexure of a ship's hull about its roll, pitch and yaw axes. It may be desired to measure short term distortion such as that caused by environment conditions e.g. waves, or long term distortion such as that caused by differential thermal expansion or variations in load states. For example, in the case of an oil tanker it may be necessary to fill the various tank sections evenly with oil so as to eliminate a local high stress point which may give rise to problems in a heavy sea.

Continuous monitoring of ship's hull flexure during a sea voyage is useful in quantifying heavy sea damage to a hull and in providing information regarding the state of the hull, ageing effects and loading effects. With a given loading, as the hull weakens with age it may be that there is an increase in flexure in given sea conditions.

In the case of a warship, an important parameter is the angular relationship between the director (such as an electro-optic tracker or radar) and the weapons system e.g. missile system or gun. The director provides the angular information and range of the target and this information is supplied to the weapons system to enable targetting of the weapon. The presence of flexure in the structure of the ship introduces an uncertainty in the angular information of the target. Therefore, information regarding the ships flexure can be used to allow greater accuracy of the targetting of weapons systems thus extending the range of the weapons and/or the probability of a hit.

In the past, warship flexure has been measured using video cameras set up to record the relative movement of specially provided targets attached to the superstructure of the ship. It has also been proposed to use laser beams aligned on electro-optical position detectors, this method being constrained by the limitations of the compartment sizes below deck.

It is also known to use inertial monitoring monitoring of flexure by arranging gyroscope clusters, each consisting of three mutually orthogonal rate gyroscopes and associated accelerometers, initially aligned with the ship's three principle axes and located at two well-spaced locations. The clusters are connected electrically so as to produce differential output signals proportional to their relative displacement from each axis. Such a system is very costly requiring an inertial cluster for each weapons platform. The flexure of a submarine hull also needs to be known to enable accurate weapons alignment. The submarine obtains information regarding its attitude (roll, pitch and heading), position and velocity from an inertial navigation system or other navigational aid. This information needs to be transmitted to the weapons system for targetting. If there is flexure of the submarine hull, then the attitude information will be in error due to the flexure, which error is likely to cause degradation of the weapons system performance.

Strong large structures in space are sometimes made of advanced composite materials such as reinforced carbon fibre. In the space environment there can be large temperature differentials across large structures, with full sunlight on the one side causing heating, and shade on the other side leading to cooling. Under these conditions there can be a large distortion of the structure, either in the form of bending or twisting.

Where precision alignment is required, a system of distortion sensors and actuators may be needed dynamically to align the structure. The alignment may need to take place in real time, with a response time of less than a second, so that the sensors need to have a short reaction time.

It is an object of the present invention to provide a method and a system for monitoring the relative positions of spaced points on a structure which helps solve the problems with existing techniques and systems used for this purpose.

According to the present invention we provide a method of monitoring the relative positions of spaced points on a structure, the structure having a fibre optic cable attached thereto and/or therein so that the length of the cable changes in response to deformation of the structure, comprising:

transmitting an optical signal along the cable, receiving the signal after it has passed along the length of the cable, and analysing said received signal, wherein the optical signal itself provides sufficient information to enable information regarding the length of the cable to be derived.

This technique can be used in all of the practical applications mentioned above and provides a relatively simple and reliable technique for detecting relative movement whether or not a line of sight is available.

Preferably, the method comprises continuously monitoring the length of the fibre optic cable.

In the embodiment to be described, the analysing step comprises measuring the phase of the received signal and comparing it with a reference phase value. In a particular embodiment, the optical signal comprises signal components of different frequency.

Combining phase information by measurement at the receiver from two or more frequencies enables the inherent $2\pi$ ambiguity of a single frequency to be removed.

The method may comprise transmitting optical signals along at least two cables attached to or in the structure. Preferably two cables are arranged in parallel one each side of the neutral axis of the particular type of distortion to be measured.

The advantage of using two or more cables to sense bend type distortions (as opposed to twist) is that information regarding angular distortion of the structure can be obtained. Regarding alignment of weapons systems, it is angular distortion which is the most important.

The use of two cables arranged in parallel enables the effects of linear thermal expansion to be discounted if only angular deformation is of interest, i.e. using two cables enables common mode rejection.

Furthermore, the method may comprise using a fibre optic cable arranged diagonally with respect to the length axis of the structure in order to monitor twisting distortion. Preferably, two cables are used, each arranged generally diagonally, or helically, and in the opposite sense.

Preferably, the fibre optic cable is arranged in a looped configuration. This enables the optical signal transmitting and receiving apparatus to be in the same location. Multicore cable may be used to enhance sensitivity by forming a single complete loop by joining the many lines end to end. Single mode or multimode cables may be used.

According to a second aspect of the present invention we provide a system for monitoring the relative positions of spaced points on a structure comprising a fibre optic cable attached to and/or in the structure so that the length of the cable changes in response to deformation of the structure, means for transmitting an optical signal along the length of the cable, means for receiving said signal after it has passed along the cable and means for analysing said signal, wherein the optical signal itself provides sufficient information to enable information regarding the length of said cable to be derived.

Preferably, the fibre optic cable is attached along its length to the structure.

According to a further aspect of the present invention we provide a structure which has a fibre optic cable attached thereto so that the length of the cable changes in response to deformation of the structure.

Particular embodiments of the present invention will now be described, by way of example, with reference to the accompanying drawings in which:

FIG. 1 is a diagram of a distance measuring system according to the present invention;

FIGS. 4 and 5 are schematic side and front views of a warship;

Figure 2:
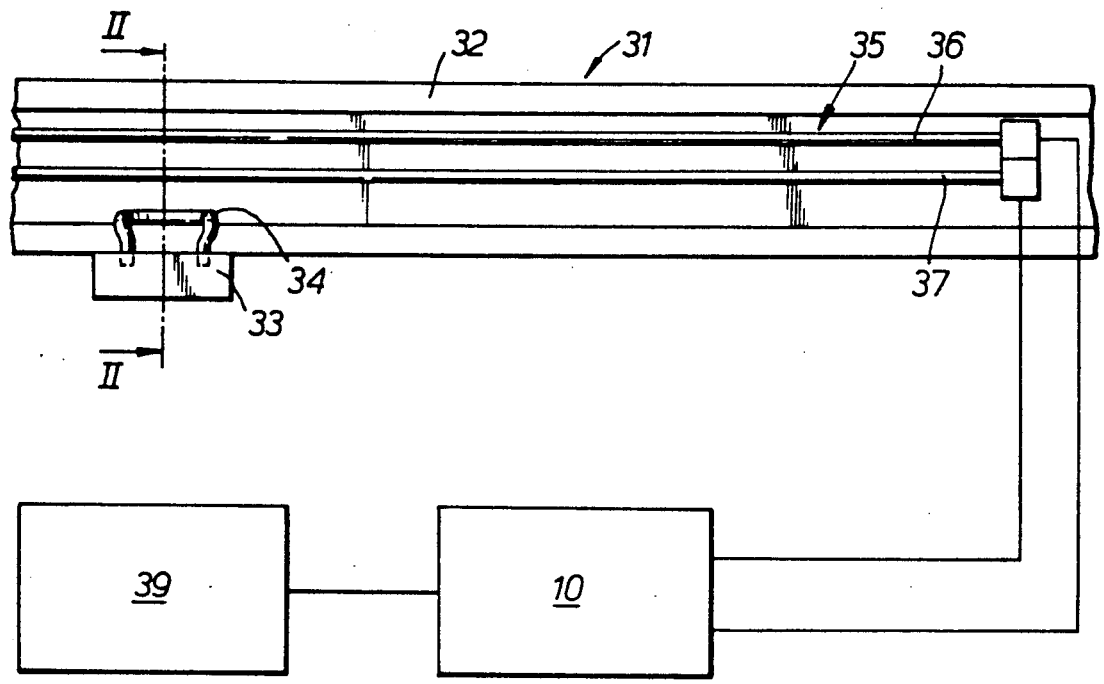
FIG. 2 is a schematic view of a railway line monitoring system according to the invention.

FIG. 1 shows a system 10 comprising two multimode fibre optic cables 12, 14 each of which is connected to a programmable optical switch 16 (such as NEC type OD-8754) and to a passive splitter 18 (such as an NEC type OD-8605 optical directional coupler) which in turn are connected to distance measurement equipment 20 (such as the Wild Fibredist manufactured by Wild-Heerbrugg) adapted to receive and transmit light by means of a fibre.

The fibre optic cables 12, 14 are multicore cables each comprising four cores joined end to end to form a continuous looped configuration in which the two free ends of the loop are connected to the optical switch 16 and the splitter 18. The cables 12 and 14 are bonded along their complete length to the structure to be monitored. Tight jacketed fibre cable (rather than the more commonly used strain-relieved fibre cable) is used so that any small strains felt by the outer jacket, which is tightly bonded to the structure, are faithfully transmitted to the fibres within the cable. If 1 is the length of the cable bonded to the structure and there are m cores in the cable, a deformation of the structure resulting in a length change between the ends of the cable of $\Delta 1$ gives an overall fibre length change of m $\Delta 1$. Thus using multicore cable increases sensitivity, e.g. a sixteen-way cable will be a sixteen fold improvement in sensitivity relative to a single core cable.

In operation, a light signal is transmitted along an input optical fibre 22 from the transmit port 24 of the distance measurement equipment 20 and is routed to one of the cables 12 and 14 by the switch 16. The light signal is propagated from a modulated source and contains components of two or more frequencies in order to enable an unambiguous phase and hence distance measurement to be made. For example, three decades of frequency may be used as follows:

a 30 MHz component which will undergo a $2\pi$ phase change every 10 meters;

a 3 MHz component which will undergo a $2\pi$ phase change every 100 meters;

a 0.3 MHz frequency component which will undergo a $2\pi$ phase change every 1000 meters.

The components mentioned above are produced by switching a light source on and off at the required frequency and the arrangement is such that each frequency component is a sinusoidal waveform.

The Fibredist measures the phase of the light which returns from the respective cable 12, 14 via a receive port 26 at the modulation frequencies and has sufficient information to determine the phase of the returning signal unambiguously to enable a distance measurement to be made. The Fibredist records the optical path length and displays half this length and the displayed distance is thus:

$$\frac{\eta m l}{2}$$

Where 1 is the length of the cable bonded to the structure, m is the number of cores in the cable and $\eta$ is the propagation constant of the light in the fibre which is very close to the refractive index of the fibre core. For silica, the value of $\eta$ changes by about 10 ppm per °C. However, if the fibre optic cable is bonded to a metal structure, then the effects of thermal expansion will outweigh the temperature sensitivity of the propagation constant. In the case of aluminium, a thermal expansion value of about 25 ppm per °C. is expected.

The Fibredist can measure distance in excess of 2 kilometers with an accuracy of approximately + or − 4 mm under worst conditions and can handle distances up to 10 kilometers.

The Fibredist 20 is connected to a datalogging computer which records changes in the length of the cables and processes this information according to the particular application in question.

Figure 3:
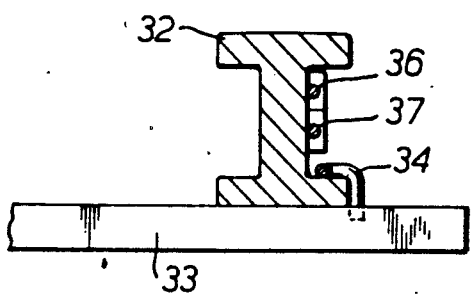
FIG. 3 is a section on II—II in FIG. 2.

A system according to the invention which can be used to measure the deformation of a section of railway track will now be described with reference to FIG. 2 and 3. In the figures, a length 31 of railway line comprises I-section beam 32 mounted on sleepers 33 (only one of which is shown) by means of clips 34 (only one shown). A length of fibre optic cable 35 is glued to one side of the beam 32 and forms a continuous loop having an outward path 36 and a return path 37. The length of the cable may be 1km long but naturally the length is chosen to be compatible with the section of line being monitored and may be any length up to 5km. A monitoring system 10 as described above is connected to the ends of cable 35 and is operable to send an optical signal along the outward path 36 and to receive the same signal along the return path 37, thereby measuring the length of the cable 35 to an accuracy of about 4mm in 1km. Changes in length of the line due to temperature are continuously monitored and recorded so that these changes can be discounted when a train produces deformation of the line. The system 10 is connected to a data-logging computer 39 by a serial computer data bus such as the RS 232 bus. As a train passes over the line, the computer 39 records changes in length of the cable 35 and hence the deformation of the line 31 produced by the train. This deformation is compared with that produced by previous trains to determine whether the section of line being monitored is faulty or not. The exact portion of the line being monitored which is faulty can be determined using information relating to the speed of the train and the time of deformation.

The system 10 needs to be directly connected to the cable 35 but may be positioned several meters away with a multimode cable connecting the two together. The computer 39 may be positioned at the aforementioned control point and may be several kilometers away from the line.

The system described above utilises normal trains passing over the track as a 'self test' facility As a train passes over a section of track, there is a temporary, localised deformation induced in the lines of that section. This deformation may be as much as several millimeters along the whole length of the train and should be easily recognised by the system even during normal operation. If the section of tracks is faulty, the deformation is either abnormally large or may be permanent after the train is passed. The deformation of the track is then signalled to a control point which may be several kilometers away from the section of track being monitored.

A high level of automation of monitoring for railway lines can be achieved using a system as described above.

Such an automated system may include automatic datalogging and automatic identification of a faulty section of line. Various warning levels can be incorporated into an automated system, for example, a warning may be given if their design limits, or a portion of track closed when a fault is detected and all trains could be re-routed to avoid the faulty section.

Referring now to the FIGS. 4 and 5, a warship is indicated at 40 and comprises a director 42, such as an electro optic tracker or radar, mounted on a mast 44 and a weapons system 46, such as a missile system or gun. The weapons system 46 is shown aiming at a notional target 48.

The short term dynamic flexures about the three principle axes of the ship due to weather and sea state are:

"Hog" and "Sag" about the pitch axis - sag is when the middle of the hull is lower than the ends and hog is when the middle of the hull is higher than the ends;

"Bend" about the yaw axis, and

"Twist" about the roll axis.

The most important type of deformation in ships is hogging and sagging: Two fibre optic cables 50 and 51 are attached to the hull as shown in FIG. 4 in order to measure the degree of hogging and sagging. Under a uniform sag, the fibre 50 is shortened whilst the fibre 51 is lengthened. To take a typical example, when a twelve-way multicore cable of 50 meters in length is used and there ar 10 meters between the top and bottom cables, a deformation of one milliradian gives rise to a length difference between top and bottom of 20 millimeters giving an overall fibre length change (n 1) of 240 millimeters. The top fibre 50 decreases in length by 120 millimeters and the bottom fibre 51 increases in length by 120 millimeters. Assuming a propagation constant ($\eta$) of 1.5 for the propagation of the light down the cables, the above mentioned Fibredist will register length changes of ±90 millimeters. The Fibredist has an accuracy of ±4 millimeters, suggesting that the accuracy of distortion measurement is approximately 15 arcseconds.

The flexure information obtained by the system is passed on a data bus to the weapon control computer. The flexure information can thus be used to correct the angular position of the weapon to improve the accuracy.

The sampling rate needs to be high (typically 10Hz) so that the flexure due to wave motion is taken out sufficiently quickly to give valid data to correct the weapons system angle. Distance measurement equipment is available that samples at 30Hz and outputs the data on an RS232 serial link at this rate. The length measurement at this rate is used by a local computer to calculate the distortion. This distortion information is then transferred by the ships data bus to the missile control computer.

Since the director is mounted at the top of the mast it may also be necessary to know the flexure of the mast. A similar system of fibre cables can be used, running up the mast fore and aft, to determine mast flexure.

In order to measure flexure in the horizontal plane, two further cables, 52 and 53, are attached to the ships hull. The cables 52 and 53 are aligned with the cables 50 and 51 on the other side of the hull as can be seen in FIG. 5. A comparison of the length of the pairs of cables 50 and 52 and/or 51 and 53 gives information regarding the horizontal flexure (bending) of the hull whilst a comparison between the length of the cables 50 and 51 and/or 52 and 53 gives the vertical flexure of the hull.

Figure 6:
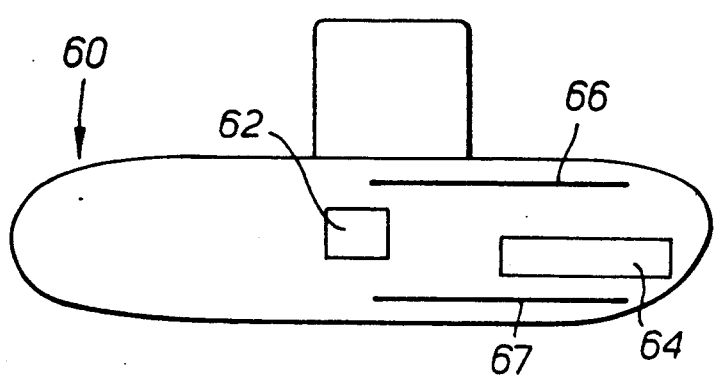
FIG. 6 and 7 are schematic side and front views of a submarine.
Figure 7:
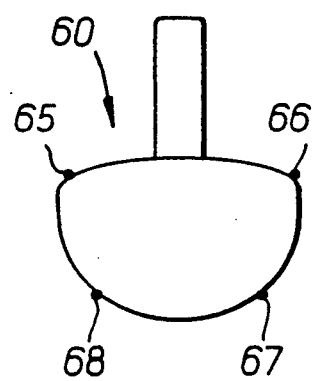

Referring now to FIGS. 6 and 7, a submarine is indicated generally at 60 having a master inertial navigation system indicated at 62 and a weapon system indicated at 64. Four fibre optic cables 65, 66, 67 and 68 are bonded to the outside of the submarine hull. A fibre optic feed through is required to take the cable through the pressure hull to distance measuring means as described with reference to FIG. 1 within the submarine. The cable terminations are made to be pressure tight down to the maximum operating depth of the submarine. Two single core ways are required for each of the four cables attached to the hull. The eight ways can be passed through a single feed through.

The main purpose of the cables is to enable flexure of the submarine hull, which will affect the accuracy of the weapon system, to be measured. The weapons system 64 receives targetting information from the intertial navigation system 62. For this reason, the cables 65, 66, 67 and 68 extend from a location near the inertial navigation system to the weapon system 64.

In this way, hogging, sagging and bending of the submarine hull can be taken into account during targetting.

Figure 8:
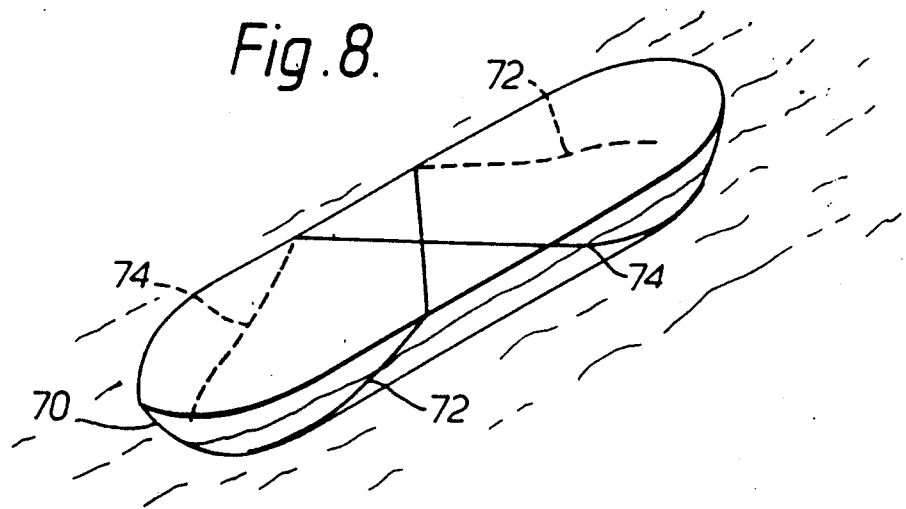
FIG. 8 is a schematic side view of a ships hull.

Referring to FIG. 8, a ships hull 70 has two fibre optic cables 72 and 74 bonded thereto. The cable 72 begins at the bottom of the hull 70 at the bow and is bonded to the port side of the hull as it extends upwardly. It then passes across the top of the hull and is bonded on the starboard side as it extends downwardly towards the stern. The cable 74 is arranged oppositely beginning at the bottom of the starboard side near the bow.

The cables 72 and 74 are positioned so as to approximate to left and right handed helices respectively. Therefore, if the hull 70 undergoes a twisting distortion, one of the cables 72 and 74 will lengthen and the other will shorten according to the sense of the twist. Measuring the resultant length difference between the cables will give information about the magnitude and nature of the twist.

The cables 72 and 74 are attached so that each experiences counterbalancing effects on either side of the neutral axes of hog/sag and bend distortions so that the arrangement shown is sensitive only to twist. For example, as the result of a sag, the length of each cable 72, 74 below the neutral axis of the sag will lengthen and the length of each cable 72, 74 above the neutral axis of the sag will shorten so that there should be no net length difference.

One end of each of the fibre optic cables 72, 74 will have two fibre leads for transmission to and reception from the distance measuring instrument.

In practice, when four fibre optic cables are being used, as described with respect to FIGS. 4 to 7 two distance measuring instruments (such as 20 in FIG. 1) will be used. The operation is likely to be controlled by a micro computer which operates the instruments and switches and which collects the data over an RS232 bus and transmits the calculated distortion to the weapon control system.

In relation to submarines and warships, the alignment of the weapon system is usually performed in dry dock, e.g. by using conventional surveying instruments. At this time the fibre optic system can be nulled. During operation, the fibre optic system can enable continuous monitoring to take place so that up to date information regarding hull distortion is always available.

It is envisaged that instead of bonding a fibre optic cable to the exterior of a structure, it may be held within the material of the structure e.g. between the laminations in a helicopter rotor blade.

Figure 9:
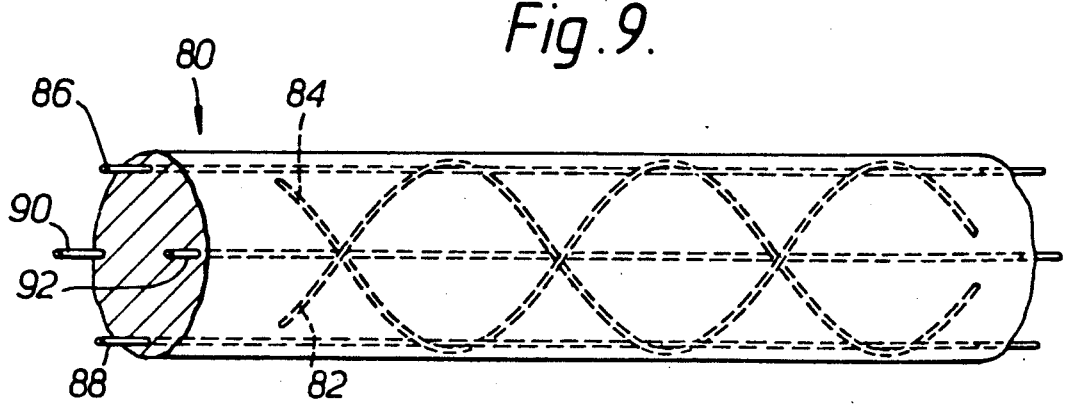
FIG. 9 is a diagrammatic representation of a spar forming part of a space structure.

FIG. 9 shows a spar 80 formed from carbon composite material and adapted to form part of a structure to be used in space. The spar 80 has two oppositely wound helical fibre optic cables 82 and 84 bonded therein for sensing deformations due to twisting of the spar. Four longitudinal fibre optic cables 86, 88, 90 and 92 are also bonded into the spar 80 and are arranged in opposed pairs to sense bending of the spar about mutually perpendicular axes.

During the course of construction of the spar 80 the fibre optic cables 82 to 92 will be bonded along their length to the spar. Further carbon fibre laminates can be laid on top of the fibres, so that the fibre optic cables are completely embedded within the structure. Only the bare fibre, with a plastic jacketing to give mechanical strength during handling, will be used to form the fibre cables, and so there is an insignificant increase in the volume of the structure.

Each fibre optic cable is a multicore cable comprising several cores joined end to end to form a continuous looped configuration and has two fibre optic tails connected to distance measurement equipment comprising a space qualified module with the following component parts:

(i) A modulator with good frequency control to set the scalefactor accuracy of the sensor.
(ii) A light source, with optics to interface to the optical fibre transmission port. The light source will be modulated by the modulator.
(iii) A detector with good phase accuracy to receive the modulated light signal.
(iv) A phase measurer for comparing the phase of the transmitted light and the received light.
(v) Power supply conditioning equipment.

The modulation frequency will be set according to the requirements. A given fibre optic sensor coil will have an expected optical length change over the operational environment. The modulation frequency will be chosen so that a $2\pi$ phase shift is obtained for a larger optical length change than the expected value, so there is no phase ambiguity. The sensor coil length and the number of turns of the coil will be set by the requirements of angular accuracy and size and shape of the monitored element.

Each fibre optic cable bonded to the structure will have a certain coefficient of optical length change per unit temperature rise. In a space environment there are not likely to be any other forces apart from temperature differentials driving distortions, and as the system is being used as a nulling sensor the scale factor is not critical as long as there is good matching between opposing fibre optic cables.

FIG. 9 shows a cylindrical spar 80 which is 1m in diameter and 10m long. If the spar 80 needs to be maintained to 1 arc second of angle, a length difference across the spar of 5$\mu$m needs to be determined. By using 100 loops of fibre, the length difference is amplified to 0.5mm. If the spar is expected to deflect by up to 5 minutes of arc this corresponds to a length change of 150mm, so setting the frequency to give 0.5m for $2\pi$ phase change will give an unambiguous phase. The phase needs to be determined to 0.3°, and the frequency accuracy of the modulation source needs to be about $4\times10^{-7}$ if separate sources are used on opposing fibre cables. This will result in 2km of fibre being laid and a modulation frequency of 300MHz. If the same modulation source is used on opposing fibre cables, then this accuracy can be relaxed.

The length of a fibre optic cable, or the change in length of such a cable may be measured in ways other than by using phase information depending on the particular application in question e.g. an interferometric method may be used or a method involving the timing of a pulse transmitted along the cable.

A system according to the present invention has the advantage of enabling distance measurement along paths where there is no line of sight. The system has good immunity to environmental effects such as pressure, magnetic fields and electro magnetic interference. It enables continuous unmanned readings with excellent long term stability and can deal with high data rates to measure rapid motion, e.g. that produced as a result of wave motion. Furthermore, the invention provides a system which is of relatively low cost compared to known systems for comparable use and keeps results of high accuracy for small angular misalignments.

I claim:

1. A system for monitoring the condition of railroad track, especially with regard to deformations in the track when a train passes over such track, said system comprising:
   a multicore fibre optic cable bonded to a portion of railroad track to be monitored such that cable length changes in response to deformation of the track;
   means for transmitting an optical signal along said cable;
   means for receiving said signal after it has passed along said multicore cable;
   means for analyzing said signal wherein information is derived regarding deformation of the track at various positions along the length of the cable;
   means for comparing deformations of the track as measured by said cable during passage of a train with deformations produced by previous trains, where differences in deformation are analyzed to determine the integrity of said track.

2. In a vehicle having a director means for tracking a target and a weapon system for providing a means for attacking said target, where said director means and said weapon system are separated by a distance and connected by a structure, an improvement comprising:
   a multimode fibre optic cable mounted on said structure between said director means and said weapon system so that the length of said cable changes in response to deformation of the structure between said director means and said weapon system;
   means for transmitting an optical signal along said cable;
   means for receiving said signal after it has passed along said cable; and
   means for analyzing said signal and providing correction information to at least one of said weapon system and director means, indicative of any change in alignment between said director means and said weapon system caused by deformation of the structure.

* * * * *